USO11567184B2

(12) United States Patent
Hwang et al.

(10) Patent No.: US 11,567,184 B2
(45) Date of Patent: Jan. 31, 2023

(54) METHOD FOR DETECTING MULTIPLE TARGETS USING RADAR AND APPARATUS FOR THE SAME

(71) Applicants: ELECTRONICS AND TELECOMMUNICATIONS RESEARCH INSTITUTE, Daejeon (KR); PUKYONG NATIONAL UNIVERSITY INDUSTRY-UNIVERSITY COOPERATION FOUNDATION, Busan (KR)

(72) Inventors: Sung Hyun Hwang, Daejeon (KR); Woo Jin Byun, Daejeon (KR); Sung Jin Yoo, Daejeon (KR); Jae Hyun Park, Busan (KR)

(73) Assignees: ELECTRONICS AND TELECOMMUNICATIONS RESEARCH INSTITUTE, Daejeon (KR); PUKYONG NATIONAL UNIVERSITY INDUSTRY-UNIVERSITY COOPERATION FOUNDATION, Busan (KR)

( * ) Notice: Subject to any disclaimer, the term of this patent is extended or adjusted under 35 U.S.C. 154(b) by 725 days.

(21) Appl. No.: 16/550,086

(22) Filed: Aug. 23, 2019

(65) Prior Publication Data
US 2020/0064461 A1 Feb. 27, 2020

(30) Foreign Application Priority Data

Aug. 23, 2018 (KR) .................. 10-2018-0098374
Aug. 7, 2019 (KR) .................. 10-2019-0096113

(51) Int. Cl.
*G01S 13/58* (2006.01)
*G01S 13/93* (2020.01)
(Continued)

(52) U.S. Cl.
CPC .......... *G01S 13/584* (2013.01); *G01S 13/931* (2013.01); *G01S 7/356* (2021.05)

(58) Field of Classification Search
CPC ...... G01S 13/584; G01S 13/931; G01S 7/356; G01S 13/726; G01S 7/354; G01S 13/42; G01S 13/878
See application file for complete search history.

(56) References Cited

U.S. PATENT DOCUMENTS 9,013,347 B2   4/2015 Park et al.
9,547,078 B2   1/2017 Kuehnle et al.
(Continued)

FOREIGN PATENT DOCUMENTS

WO        2017187337 A1    11/2017
WO    WO-2017187337 A1 *  11/2017  ........... G01S 13/325

*Primary Examiner* — Erin F Heard
*Assistant Examiner* — Juliana Cross (57) ABSTRACT

An operation method performed by an apparatus for detecting multiple targets may comprise transmitting first signals using $M_t$ transmit antennas included in the apparatus; receiving the first signals reflected by the multiple targets through $M_r$ receive antennas included in the apparatus; generating a first function for estimating a velocity and an azimuth of each of the multiple targets using the first signals and the reflected first signals; estimating a velocity and an azimuth that maximize a result of the first function as a velocity and an azimuth of a first target closest to the apparatus among the multiple targets; generating a second function by cancelling interference caused by the first target from the first function; and estimating a velocity and an azimuth that maximize a
(Continued)

result of the second function as a velocity and an azimuth of a second target among the multiple targets.

10 Claims, 5 Drawing Sheets

(51) Int. Cl.
    *G01S 7/35*     (2006.01)
    *G01S 13/931*     (2020.01)

(56) References Cited

U.S. PATENT DOCUMENTS

| | | |
|---|---|---|
| 9,880,278 B2 | 1/2018 | van Uffelen et al. |
| 9,971,028 B2 | 5/2018 | Park |
| 10,054,671 B2 | 8/2018 | Satou et al. |
| 2015/0362580 A1* | 12/2015 | Ha .......................... G01S 3/74 |
| | | 342/417 |
| 2016/0131752 A1 | 5/2016 | Jansen et al. |
| 2017/0131397 A1 | 5/2017 | Schoor |
| 2017/0176593 A1 | 6/2017 | Satou et al. |
| 2020/0011983 A1* | 1/2020 | Kageme ................ G01S 13/325 |

* cited by examiner

METHOD FOR DETECTING MULTIPLE TARGETS USING RADAR AND APPARATUS FOR THE SAME

CROSS-REFERENCE TO RELATED APPLICATIONS

This application claims priority to Korean Patent Applications No. 10-2018-0098374 filed on Aug. 23, 2018 and No. 10-2019-0096113 filed on Aug. 7, 2019 with the Korean Intellectual Property Office (KIPO), the entire contents of which are hereby incorporated by reference.

BACKGROUND

1. Technical Field

The present disclosure relates generally to a technique for detecting multiple targets, and more specifically, to a technique for estimating distances, azimuths, and velocities of the multiple targets by using a frequency modulated continuous wave (FMCW) multiple-input multiple-output (MIMO) radar.

2. Related Art

A radar can be used to detect multiple targets ahead in a vehicle that supports autonomous driving. A vehicle-mounted radar can be used to estimate a distance, an azimuth, and a velocity of each of the multiple targets. A pulse radar, a continuous wave radar, a frequency modulated continuous wave (FMCW) radar, a frequency shift keying (FSK) radar, etc. may be used to detect multiple targets.

Using information obtained via the radar and a multiple signal classification (MUSIC) algorithm, the distance, azimuth, and velocity of each of the multiple targets can be estimated. The MUSIC algorithm has high computational complexity and is highly affected by noise. As a result, the result estimated by the MUSIC algorithm may have a large error. In this reason, it may be inappropriate to apply the conventional MUSIC algorithm to a vehicle that supports the autonomous driving function, so that algorithms that can be used in a vehicle that supports the autonomous driving function (e.g., algorithm used to detect multiple targets) are needed.

SUMMARY

Accordingly, embodiments of the present disclosure provide a method and an apparatus for detecting multiple targets by using a FMCW MIMO radar.

According to embodiments of the present disclosure, an operation method, performed by an apparatus for detecting multiple targets, may comprise transmitting first signals using $M_t$ transmit antennas included in the apparatus; receiving the first signals reflected by the multiple targets through $M_r$ receive antennas included in the apparatus; generating a first function for estimating a velocity and an azimuth of each of the multiple targets using the first signals and the reflected first signals; estimating a velocity and an azimuth that maximize a result of the first function as a velocity and an azimuth of a first target closest to the apparatus among the multiple targets; generating a second function by cancelling interference caused by the first target from the first function; and estimating a velocity and an azimuth that maximize a result of the second function as a velocity and an azimuth of a second target among the multiple targets, wherein a distance between the apparatus and the second target is greater than or equal to a distance between the apparatus and the first target, and each of $M_t$ and $M_r$ is a natural number greater than or equal to 2.

The first signals transmitted by the $M_t$ transmit antennas may be orthogonal to each other.

The first function may be generated based on a 2-dimensional multiple signal classification (MUSIC) algorithm.

The first function may comprise a first matrix formed by velocities and azimuths of the multiple targets, a Hermitian matrix for the first matrix, a second matrix formed by a noise subspace, and a Hermitian matrix for the second matrix.

$M_t \times M_r$ virtual array elements may be implemented by the $M_t$ transmit antennas and the $M_r$ receive antennas, and the first function may be generated based on the first signals and the reflected first signals transmitted and received through the $M_t \times M_r$ virtual array elements.

The generating of the second function may comprises generating a first matrix based on the velocity and the azimuth of the first target; generating a projected matrix by projecting the first matrix on an orthogonal region; and generating the second function by performing an eigenvalue decomposition on a sample covariance matrix of the projected matrix.

The operation method may further comprise generating a first matrix based on the velocity and the azimuth of the first target; generating a second signal comprising a beat frequency indicative of the distance between the apparatus and the first target using the first matrix; and estimating a result of a fast Fourier transform (FFT) on the second signal as the distance between the apparatus and the first target.

Further, an apparatus for detecting multiple targets may comprise a processor, $M_t$ transmit antennas transmitting first signals according to control of the processor, $M_r$ receive antennas receiving the first signals reflected by the multiple targets according to control of the processor, and a memory storing at least one instruction executable by the processor. Also, the processor may be configured the processor to generate a first function for estimating a velocity and an azimuth of each of the multiple targets using the first signals and the reflected first signals; estimate a velocity and an azimuth that maximize a result of the first function as a velocity and an azimuth of a first target closest to the apparatus among the multiple targets; generate a second function by cancelling interference caused by the first target from the first function; and estimate a velocity and an azimuth that maximize a result of the second function as a velocity and an azimuth of a second target among the multiple targets, wherein a distance between the apparatus and the second target is greater than or equal to a distance between the apparatus and the first target, and each of $M_t$ and $M_r$ is a natural number greater than or equal to 2.

The first function may comprise a first matrix formed by velocities and azimuths of the multiple targets, a Hermitian matrix for the first matrix, a second matrix formed by a noise subspace, and a Hermitian matrix for the second matrix.

$M_t \times M_r$ virtual array elements may be implemented by the $M_t$ transmit antennas and the $M_r$ receive antennas, and the first function may be generated based on the first signals and the reflected first signals transmitted and received through the $M_t \times M_r$ virtual array elements.

When the second function is generated, the at least one instruction may be further configured the processor to generate a first matrix based on the velocity and the azimuth of the first target; generate a projected matrix by projecting the first matrix on an orthogonal region; and generate the second function by performing an eigen-value decomposition on a sample covariance matrix of the projected matrix.

The at least one instruction may be further configured the processor to generate a first matrix based on the velocity and the azimuth of the first target; generate a second signal comprising a beat frequency indicative of the distance between the apparatus and the first target using the first matrix; and estimate a result of a fast Fourier transform (FFT) on the second signal as the distance between the apparatus and the first target.

According to the embodiments of the present disclosure, the detection apparatus may generate a first function for estimating parameters (e.g., velocity, azimuth, distance) of multiple targets based on signals reflected by the multiple targets, and estimate a velocity and an azimuth that maximize the first function as a velocity and an azimuth of a first target closes to the detection apparatus. The detection apparatus may generate a second function by cancelling interference caused by the first target from the first function, and estimate a velocity and an azimuth that maximize the second function as a velocity and an azimuth of a second target. By sequentially cancelling the interferences caused by the targets, the detection apparatus can accurately estimate the parameters of each of the multiple targets. In addition, computational complexity for the detection of parameters of multiple targets can be reduced.

BRIEF DESCRIPTION OF DRAWINGS

Embodiments of the present disclosure will become more apparent by describing in detail embodiments of the present disclosure with reference to the accompanying drawings, in which.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described in greater detail with reference to the accompanying drawings. In order to facilitate general understanding in describing the present disclosure, the same components in the drawings are denoted with the same reference signs, and repeated description thereof will be omitted.

Figure 1:
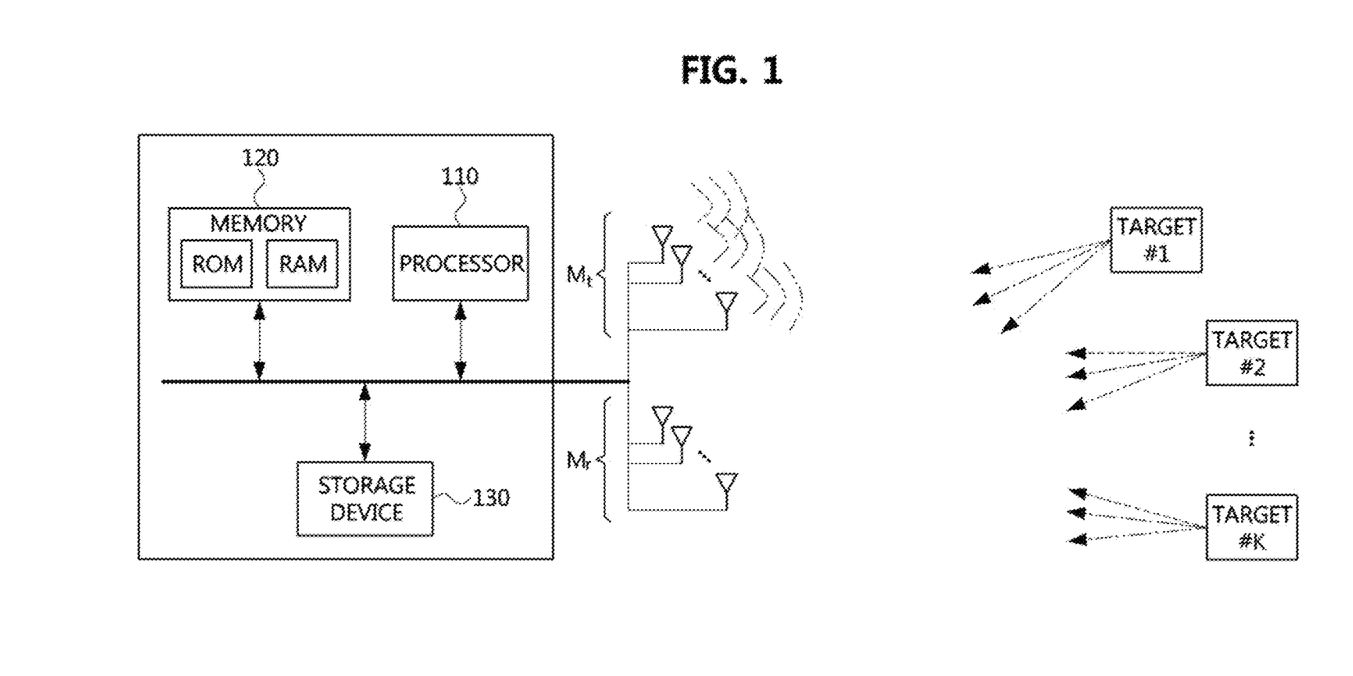
FIG. 1 is a conceptual diagram illustrating a first embodiment of a detection apparatus using a frequency modulated continuous wave (FMCW) multiple-input multiple-output (MIMO) radar.

FIG. 1 is a conceptual diagram illustrating a first embodiment of a detection apparatus using a frequency modulated continuous wave (FMCW) multiple-input multiple-output (MIMO) radar.

Referring to FIG. 1, a detection apparatus may be mounted on a vehicle and may include a processor 110, a memory 120, a storage device 130, $M_t$ transmit antennas, and $M_r$ receive antennas. Here, each of $M_t$ and $M_r$ may be a natural number. The processor 110 may execute at least one instruction stored in at least one of the memory 120 and the storage device 130. The processor 110 may refer to a central processing unit (CPU), a graphics processing unit (GPU), or a dedicated processor on which methods in accordance with embodiments of the present disclosure are performed. Each of the memory 120 and the storage device 130 may include at least one of a volatile storage medium and a non-volatile storage medium. For example, the memory 120 may comprise at least one of read-only memory (ROM) and random access memory (RAM).

The detection apparatus may transmit signals using the $M_t$ transmit antennas and the signals transmitted from the $M_t$ transmit antennas may be reflected by K targets. K may be a natural number. The $M_t$ transmit antennas may transmit signals having waveforms orthogonal to each other. Signals having mutually orthogonal waveforms may be generated by adjusting frequency offsets of the signals transmitted from the $M_t$ transmit antennas. Alternatively, signals having orthogonality may be generated based on a time division scheme. The reflected signals from the K targets may be obtained at $M_r$ receive antennas. The signals obtained at $M_r$ receive antennas can be separated.

When different frequency offsets are applied to $M_t$ transmit antennas, a signal (e.g., FMCW signal) transmitted from an $m_t$-th transmit antenna among $M_t$ transmit antennas may be defined as Equation 1 below. That is, the detection apparatus may transmit $S_{m_t}(t)$ using the corresponding transmit antenna.

$$S_{m_t}(t) = \exp\{j(2\pi(f_c + \Delta f_c(m_t - 1))t + \pi k t^2)\} \text{ for } 0 \le t \le T_{PR} \quad \text{[Equation 1]}$$

$S_{m_t}(t)$ may be the signal transmitted from the $m_t$-th transmit antenna. $f_c$ may be a carrier frequency. $\Delta f_c$ may be a frequency offset. $T_{PR}$ may be the length of one pulse in the time domain. k may be a chirp rate. $S_{m_t}(t)$ may be reflected by K targets and the signal reflected by K targets may be received at the $m_r$-th receive antenna among $M_r$ receive antennas. The signal $r_{m_r}(t)$ received at the $m_r$-th receive antenna may be defined as Equation 2 below. That is, the detection apparatus may receive $r_{m_r}(t)$ through the receive antenna.

$$r_{m_r}(t) = \sum_{k=1}^{K} \sum_{m_t=1}^{M_t} \gamma_k S_{m_t}(t - \tau_{m_r m_t k}) \quad \text{[Equation 2]}$$

$\gamma_k$ may be determined in consideration of a reflection coefficient of the target, a path loss due to a range, an antenna gain, and the like. $\tau_{m_r m_t k}$ in Equation 2 may be defined as Equation 3 below.

[Equation 3]

$$\tau_{m_r m_t k} = \frac{2}{c}\left(\frac{R_{km_t} + R_{km_r}}{2} + \frac{v_k}{2}t\right)$$
$$= \frac{2}{c}\left(R_{k0} + \frac{x_{m_{t0}} + x_{m_{r0}}}{2}\sin\theta_k + \frac{v_k}{2}t\right)$$
$$\tau_{mk} = \tau_{0k} + \frac{2}{c}(d(m-1)\sin\theta_k) + \frac{v_k}{c}t,$$
$$m = 1, \ldots, M_t M_r$$

$R_{km_t}$ may be the distance from the $m_t$-th transmit antenna to the k-th target. $R_{km_r}$ may be the distance from the $m_r$-th receive antenna to the k-th target. Here, it may be assumed that a signal is transmitted and received at a virtual antenna located at the center of the $m_t$-th transmit antenna and the $m_r$-th receive antenna. That is, by using $M_t$ transmit antennas and $M_r$ receive antennas, an antenna including $M_t \times M_r$ virtual array elements may be implemented.

Figure 2:
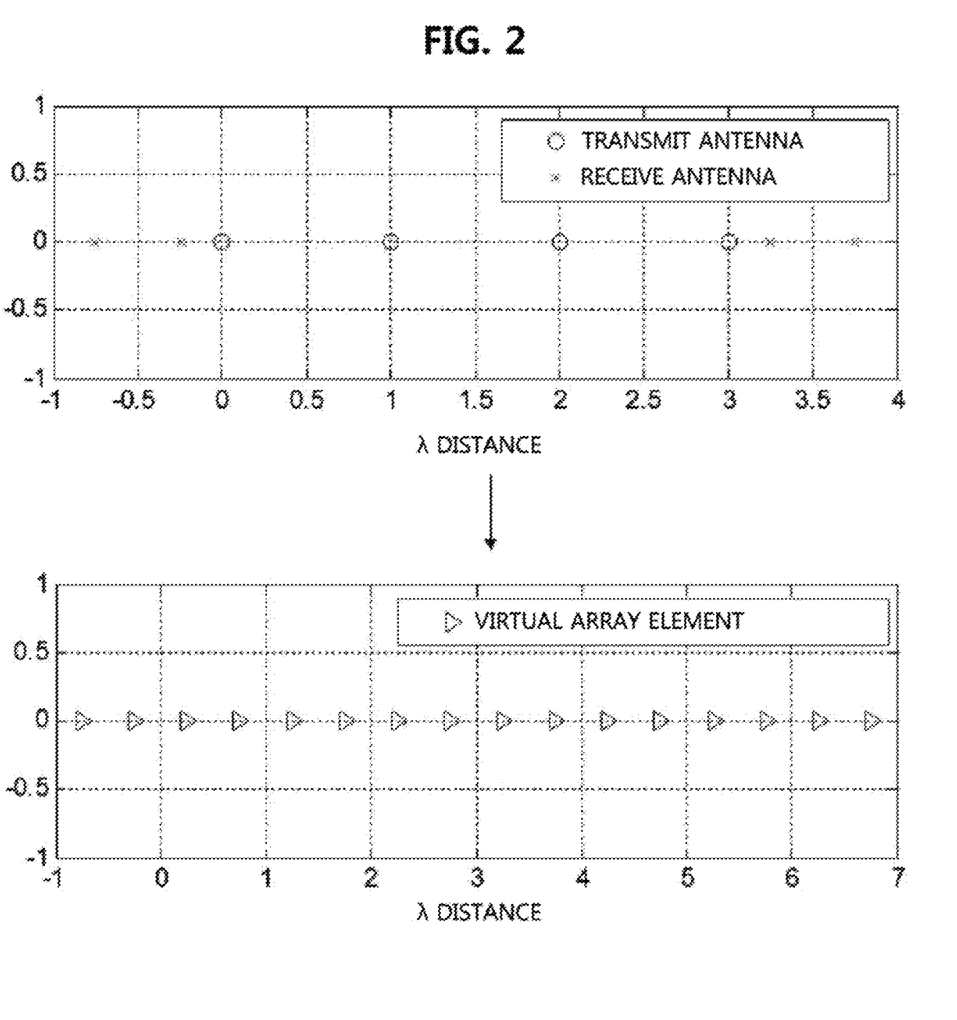
FIG. 2 is a conceptual diagram illustrating a virtual antenna formed by antennas included in a detection apparatus.

FIG. 2 is a conceptual diagram illustrating a virtual antenna formed by antennas included in a detection apparatus.

Referring to FIG. 2, a detection apparatus may include 4 transmit antennas and 4 receive antennas. In this case, a linear array antenna including 16 virtual array elements may be implemented.

In Equation 3, $v_k$ may be the velocity of the target. For example, $v_k$ may be a relative velocity of the target relative to the direction of the radar (e.g., antenna). According to $$\frac{2}{c}\left(R_{k0} + \frac{x_{m_{t0}} + x_{m_{r0}}}{2}\sin\theta_k + \frac{v_k}{2}t\right)$$

in Equation 3, the distance from the antenna to the target may be re-expressed in consideration of the effect of transmitting and receiving signals in the linear array antenna including the virtual array elements. $R_{k0}$ may be the distance from the virtual array element (e.g., reference element) included in the linear array antenna to the target.

$$\frac{x_{m_{t0}} + x_{m_{r0}}}{2}$$

may be a relative position of the virtual array element formed by the $m_t$-th transmit antenna and the $m_r$-th receive antenna. $\theta_k$ may be the azimuth of the target and may be determined based on the virtual array element included in the linear array antenna. When the index of the virtual array element included in the linear array antenna is m, and the interval between the virtual array elements is d, $$\left(\tau_{mk} = \tau_{0k} + \frac{2}{c}(d(m-1)\sin\theta_k) + \frac{v_k}{2}t, \, m = 1, \ldots, M_t M_r\right)$$

in Equation 3 may be defined.

In order to process the signals of the FMCW MIMO radar, the detection apparatus may perform deconvolution and low-pass filtering on the signals transmitted from the transmit antennas and the signals received at the receive antennas to derive the signal $x_{m_r m_t}(t)$ defined in Equation 4. $x_{m_r m_t}(t)$ may include beat frequency information.

$$x_{m_r m_t}(t) = LP\{r^*_{m_r}(t)s_{m_t}(t)\} \quad \text{[Equation 4]}$$
$$\approx \sum_{k=1}^{K} \gamma_k \exp\{j(2\pi f_c \tau_{mk} + 2\pi k \tau_{mk} t - \pi k \tau_{mk}^2)\}$$

$x_{m_r m_t}(t)$ may be sampled every Ts, and Equation 5 below may be defined by converting the sampled signal into a discrete signal.

[Equation 5]

$$x_m[n] = x_m(nT_s)$$
$$\approx \sum_{k=1}^{K} \gamma_k \exp\left\{j2\pi f_c\left(\tau_{0k} + \frac{2}{c}(d(m-1)\sin\theta_k) + \frac{v_k}{c}t\right) + \right.$$
$$\left. j2\pi k\left(\tau_{0k} + \frac{2}{c}(d(m-1)\sin\theta_k) + \frac{v_k}{c}t\right)nT_s\right\}$$

When a total of S pulses are used to detect multiple targets, the n-th sampled signal of the s-th pulse belonging to the S pulses may be defined as Equation 6 below.

[Equation 6]

$$x_m[n, s] = x_m(nT_s)|_{s-th\ pulse}$$
$$\approx \sum_{k=1}^{K} \bar{\gamma}_k \exp\left\{j2\pi f_c\left(\frac{2}{c}(d(m-1)\sin\theta_k) + \frac{v_k}{c}(sT_{PR} + nT_s)\right) + j2\pi k\tau_{0k}nT_s\right\}$$
$$= \sum_{k=1}^{K} \bar{\gamma}_k \exp\left\{j2\pi f_c\left(\frac{2}{c}(d(m-1)\sin\theta_k) + \frac{v_k}{c}(sT_{PR})\right) + j2\pi\left(k\tau_{0k} + \frac{v_k}{\lambda}\right)nT_s\right\}$$

$\bar{\gamma}_k = \gamma_k \exp\{j2\pi f_c \tau_{0k}\}$ may be defined in Equation 6. In the virtual array elements, the received signals may be represented in one vector form based on Equation 6. For example, a vector generated based on received signals in the virtual array elements may be defined as Equation 7 below.

[Equation 7]

$$x[n, s] = \begin{bmatrix} x_1[n, s] \\ \vdots \\ x_M[n, s] \end{bmatrix} = \sum_{k=1}^{K} \bar{\gamma}_k a(\theta_k) \exp\left\{j2\pi\frac{v_k}{\lambda}sT_{PR} + j2\pi\left(k\tau_{0k} + \frac{v_k}{\lambda}\right)nT_s\right\}$$

$a(\theta_k)$ may be an array response vector, and $$a(\theta_k) = \begin{bmatrix} 1 & \cdots & \exp\left\{j2\pi\frac{2d(M-1)}{\lambda}\sin\theta_k\right\} \end{bmatrix}^T$$

may be defined. x[n, s] may be represented as a vector form for all pulses as shown in Equation 8 below.

[Equation 8]

$$\bar{x}[n] = \begin{bmatrix} x[n, 1] \\ \vdots \\ x[n, S] \end{bmatrix} = \sum_{k=1}^{K} \bar{\gamma}_k b(v_k) \otimes a(\theta_k) \exp\left\{j2\pi\left(k\tau_{0k} + \frac{v_k}{\lambda}\right)nT_s\right\}$$

In Equation 8, $b(v_k)$ may be defined as Equation 9 below.

[Equation 9]

$$b(v_k) = \begin{bmatrix} \exp\left\{j2\pi\frac{T_{PR}}{\lambda}v_k\right\} & \cdots & \exp\left\{j2\pi\frac{ST_{PR}}{\lambda}v_k\right\} \end{bmatrix}^T$$
$$= \exp\left\{j2\pi\frac{T_{PR}}{\lambda}v_k\right\}\begin{bmatrix} 1 & \cdots & \exp\left\{j2\pi\frac{(S-1)T_{PR}}{\lambda}v_k\right\} \end{bmatrix}^T$$

$\bar{x}[n]$ may be expressed in form of a column for all n as shown in Equation 10 below.

$\bar{X} = [\bar{x}[1], \ldots, \bar{x}[N]]$      [Equation 10]

■ 2D Multiple Signal Classification (MUSIC) Algorithm

The detection apparatus may calculate a sample covariance matrix based on $\bar{X}$ and generate Equation 11 below by performing an eigen-value decomposition on the sample covariance matrix.

[Equation 11]

$$\bar{R} = \frac{1}{N}\bar{X}\bar{X}^H = [E_s \quad E_n]\begin{bmatrix} \sum_s & 0 \\ 0 & \sum_n \end{bmatrix}[E_s \quad E_n]^H$$

$E_S$ may be a matrix generated based on an eigenvector spanning a signal subspace. $E_n$ may be a matrix generated based on an eigenvector spanning a noise subspace. When $f(v_k, \theta_k) = b(v_k) \otimes a(\theta_k)$ is defined, the signal subspace may be orthogonal to the noise subspace. Therefore, Equation 12 below may be defined.

[Equation 12]

$$J(v, \theta) = \frac{1}{f^H(v, \theta)E_n E_n^H f(v, \theta)}$$

The detection apparatus may estimate the velocity v and the azimuth θ maximizing J(v,θ) by performing a two-dimensional grid search.

■ 2D MUSIC Algorithm to which an Orthogonal Projection-Based Interference Cancellation Technique is Applied In case where J(v,θ) has the maximum value in Equation 12, the detection apparatus may estimate a velocity v and an azimuth θ determined so that J(v,θ) has the maximum value as a velocity v and an azimuth θ of the target. However, due to the noise and the side-lobe of $f(v_k, \theta_k)$, attenuation of the signal reflected by the target located relatively far from the detection apparatus may be large. In this case, the magnitude of the signal reflected by the target located relatively far from the detection apparatus may be smaller than the magnitude of the side-lobe for the target located relatively close from the detection apparatus. Therefore, estimating the parameters (e.g., distance, azimuth, velocity) of the target may be difficult.

In order to solve this problem, the detection apparatus may generate a function used to estimate the parameters of the target (e.g., the function defined in Equation 12) based on the original received signal (e.g., the signal defined in Equation 2). The detection apparatus may calculate the maximum value of J(v,θ) defined in Equation 12, estimate the parameters of the target using the maximum value, and cancel the interference in the original received signal by performing orthogonal projection using the estimated parameters. For example, the detection apparatus may generate a first received signal by cancelling the interference caused by the target closest to the detection apparatus from the original received signal.

Thereafter, the detection apparatus may re-calculate the maximum value of J(v,θ) based on the first received signal, estimate the parameters of the target using the maximum value (e.g., the maximum value that is less than the maximum value calculated based on the original received signal), and cancel interference in the first received signal by performing orthogonal projection using the estimated parameters. For example, the detection apparatus may generate a second received signal by cancelling interference caused by the second closest target from the detection apparatus from the first received signal.

That is, when the parameters (e.g., velocity and azimuth) for the target reflecting the signal that generates the largest J(v,θ) are estimated, the detection apparatus may calculate $f(\hat{v}_1, \hat{\theta}_1)$ using the estimated parameters, and calculate a matrix projected on a region orthogonal to $f(\hat{v}_1, \hat{\theta}_1)$. The matrix projected on the region orthogonal to $f(\hat{v}_1, \hat{\theta}_1)$ may be defined as Equation 13 below.

$P_1^\perp = I_{MN} - f(\hat{v}_1, \hat{\theta}_1) * f^H(\hat{v}_1, \hat{\theta}_1) f(\hat{v}_1, \hat{\theta}_1))^{-1} f^H(\hat{v}_1, \hat{\theta}_1)$   [Equation 13]

Further, the detection apparatus may calculate Equation 12 by performing eigen-value decomposition based on the sample covariance matrix $$\left(\text{e.g., } \overline{R}_1 = \frac{1}{N} P_1^{\perp} \overline{XX}^H P_1^{\perp H}\right).$$

In this case, the detection apparatus may cancel the interference effect due to the parameters of the target reflecting the signal having the greatest strength, and accurately estimate the parameters of the next target with the interference effect cancelled. The detection apparatus may estimate the parameters of the K targets (e.g., the K targets shown in FIG. 1) by repeatedly performing the above-described operation K times. The parameters of the target having the smallest reception strength (e.g., the target farthest from the detection apparatus) can be accurately estimated.

■ 2D Root MUSIC Algorithm

Since the computational complexity of the 2D grid search is very large, the detection apparatus may estimate the parameters of the target using a 2D root MUSIC algorithm. The detection apparatus may define 2 vectors defined in Equation 14 below.

$$b(z_v) \triangleq \begin{bmatrix} 1 \\ z_v \\ \vdots \\ z_v^{S-1} \end{bmatrix},$$ [Equation 14]

$$a(z_\theta) \triangleq \begin{bmatrix} 1 \\ z_\theta \\ \vdots \\ z_\theta^{M-1} \end{bmatrix} \text{ with } z_v = e^{j\frac{2\pi}{\lambda}vT_{PR}},$$

$$z_\theta = e^{j\frac{4\pi}{\lambda}d\sin\theta_k}$$

Using 2 vectors defined in Equation 14, the denominator in Equation 12 may be defined as Equation 15 below.

$$f^H(v,\theta)E_nE_n^Hf(v,\theta)=0 \Leftrightarrow f(z_v^{-1},z_\theta^{-1})\Pi f(z_v,z_\theta)=0 \text{ with } \Pi = E_nE_n^H$$ [Equation 15]

$f(z_v, z_\theta)$ may be defined as Equation 16 below.

$$f(z_v,z_\theta) \triangleq b(z_v) \otimes a(z_\theta)=[a^T(z_\theta)z_v a^T(z_\theta) \ldots z_v^{S-1}a^T(z_\theta)]^T$$ [Equation 16]

Obtaining the parameters maximizing $J(v,\theta)$ in Equation 12 may be equivalent to finding roots of the equation for $(z_v, z_\theta)$ in Equation 15. Equation 15 may be transformed into Equation 17 below.

$$a^H(z_\theta^{-1})\left[\sum_{i,j=1}^{S} z_v^{j-1}\Pi_{ij}\right]a(z_\theta^{-1}) = 0$$ [Equation 17]

The detection apparatus may calculate $Z_v$ satisfying Equation 18 below.

$$D(z_v) = \det\left[\sum_{i,j=1}^{S} z_v^{j-1}\Pi_{ij}\right] = 0$$ [Equation 18]

When $Z_v = e^{j\frac{2\pi}{\lambda}vT_{PR}}$ is defined, a velocity-related root among the roots of Equation 18 may be located on a unit circle of size 1. Thus, in order to estimate the velocities of the K targets, the detection apparatus may select K roots (e.g., $\hat{Z}_v^{(k)}$, k=1, ..., K) closest to the unit circle and estimate the velocities of the K targets based on Equation 19 below.

$$\hat{v}_k = a\sin\left(\frac{\lambda}{2\pi T_{PR}}\arg(\hat{z}_v^{(k)})\right) k = 1, \ldots, K$$ [Equation 19]

The detection apparatus may calculate $(\hat{\Pi}_k = [\Sigma_{i,j=1}^{S}(\hat{Z}_v^{(k)})^{j-i}\Pi_{ij}]$, k=1, ..., K) based on $\hat{Z}_v^{(k)}$, k=1, ..., K. The detection apparatus may obtain Equation 20 below by inputting $(\hat{\Pi}_k = [\Sigma_{i,j=1}^{S}(\hat{Z}_v^{(k)})^{j-i}\Pi_{ij}])$ into Equation 17.

$$f_k(z_\theta) = a_t^T(z_\theta^{-1})\hat{\Pi}_k a_t(z_\theta^{-1}) = 0 \ k = 1, \ldots, K$$ [Equation 20]

When $Z_\theta = e^{j\frac{4\pi}{\lambda}d\sin\theta_k}$ is defined, an azimuth-related root among the roots of Equation 20 may be located on a unit circle of size 1. Thus, to estimate the azimuths of the K targets, the detection apparatus may select K roots closest to the unit circle from the roots of Equation 20 and estimate the azimuths of K targets based on Equation 21 below.

$$\hat{\theta}_k = a\sin\left(\frac{\lambda}{4\pi d}\arg(z_\theta^{(k)})\right) k = 1, \ldots, K$$ [Equation 21]

■ 2D Root MUSIC Algorithm Based on Low-Complexity Approximation

Equation 14 is a function for $$Z_v = e^{j\frac{2\pi}{\lambda}vT_{PR}},$$

and when $Z_v = e^{j\varnothing}$ is defined, $D(Z_v)$ may be represented as $D(\varnothing)$. That is, $D(\varnothing)$ may be a periodic function having a periodicity of $2\pi$. The detection apparatus may express $D(\varnothing)$ as a Fourier series as shown in Equation 22 below.

$$\text{Fourier Series: } D(\phi) = \sum_{n=-\infty}^{\infty} F_n e^{jn\phi}$$ [Equation 22]

$F_n$ may be defined as Equation 23 below.

$$F_n = \frac{1}{2\pi}\int_{-\pi}^{\pi} D(\phi)e^{-jn\phi}d\phi \approx \frac{1}{2\pi}\sum_{l=-N}^{N} D(l\Delta\phi)e^{-jnl\Delta\phi}\Delta\phi \triangleq \hat{F}_n,$$ [Equation 23]

$$\Delta\phi = 2\pi/(2N+1)$$

The detection apparatus may derive Equation 24 by approximating the determinant of Equation 18 through the Fourier series.

$$D(e^{j\phi_v}) = \det\left[\sum_{i,j=1}^{S}(e^{j\phi_v})^{j-1}\Pi_{ij}\right] \approx \sum_{n=-N}^{N} \hat{F}_n e^{jn\phi_v} = 0$$ [Equation 24]

A polynomial degree for z in Equation 24 may be (S−1)× M. In this case, the polynomial degree may increase as S or M increases. If the polynomial order for z in Equation 24 is set to satisfy N<(S−1)×M, the detection apparatus may efficiently find the roots of Equation 24 with low polynomial degree. The detection apparatus may estimate the velocities of K targets using the roots of Equation 24 and Equation 19, and may estimate the azimuths of K targets using the roots of Equation 24 and Equations 20 and 21. Since the degree of the equation used for the azimuth estimation is not high, the detection apparatus may accurately estimate the azimuth without approximation. When necessary, the detection apparatus may estimate the azimuth by performing approximation.

■ 2D Root MUSIC Algorithm Based on Low-Complexity Approximation Considering Weight Values The detection apparatus may approximate $D(e^{j\varnothing_v})$ defined in Equation 24 together with a weight $w(\phi_l)$. For example, the detection apparatus may approximate $D(e^{j\varnothing_v})$ based on Equation 25 below.

$$\min_{\{G_m\}} \sum_{l=1}^{L} w(\phi_l) \left| D(e^{j\phi_l}) - \sum_{m=-M}^{M} G_m e^{jm\phi_l} \right|^2 \quad \text{[Equation 25]}$$

$$\text{s.t. } G_m^* = G_{-m}$$

When $D(e^{j\varnothing_v})=0$ is satisfied, the detection apparatus may define $w(\phi_l)$ as shown in Equation 26 below for precise approximation.

$$w(\phi_l) = \frac{1}{\left(D(e^{j\phi_l}) + \varepsilon\right)} \quad \text{[Equation 26]}$$

$D(e^{j\varnothing_v})$ may be a determinant of a Hermitian symmetric matrix. Thus, $D(e^{j\varnothing_v})$ may always have a real value, and Equation 25 may be redefined as Equation 27 below.

$$\min_{u} \sum_{l=1}^{L} \left\| W^{1/2}(d - Bu) \right\|^2, \quad \text{[Equation 27]}$$

$$W = \text{diag}(w(\phi_1), \ldots, w(\phi_L))$$

The parameters of Equation 27 may be defined as Equation 28 below.

$$u = [G_0, \text{Re}(G_1), \ldots, \text{Re}(G_M), \text{Im}(G_1), \ldots, \text{Im}(G_M)]^T$$

$$d = [D(e^{j\phi_l}), \ldots, D(e^{j\phi_L})]^T$$

$$B = [1_L, 2\text{Re}(\tilde{B}), 2\text{Im}(\tilde{B})], [\tilde{B}]_{l,m} = e^{jm\phi_l} \quad \text{[Equation 28]}$$

The detection apparatus may calculate the roots of Equation 27 based on Equation 29 below.

$$u = (B^T W B)^{-1} B W d \quad \text{[Equation 29]}$$

Therefore, the detection apparatus may calculate the roots satisfying $\Sigma_{m=-M}^{M} G_m e^{jm\varnothing_l}=0$ efficiently. The detection apparatus may estimate the velocities of K targets using the roots of Equation 27 and Equation 19, and may estimate the azimuths of the K targets using the roots of Equation 27 and Equations 20 and 21. Since the degree of the equation used for the azimuth estimation is not high, the detection apparatus may accurately estimate the azimuth without approximation. When necessary, the detection apparatus may estimate the azimuth by performing approximation.

The detection device may estimate the distance between the detection apparatus (e.g., antenna) and the target using the estimated velocity and azimuth. The detection apparatus may calculate $f(\hat{v}_k, \hat{\theta}_k)$ using the estimated velocity and azimuth. $f(\hat{v}_k, \hat{\theta}_k)$ may be defined as Equation 30 below.

$$f(\hat{v}_k, \hat{\theta}_k) = b(\hat{v}_k) \otimes a(\hat{\theta}_k) \quad \text{[Equation 30]}$$

The detection apparatus may calculate $y_k$ defined in Equation 31 by multiplying $f^H(\hat{v}_k, \hat{\theta}_k)$ and $\overline{X}$ defined in Equation 10.

$$y_k = f^H(\hat{v}_k, \hat{\theta}_k)\overline{X} = f^H(\hat{v}_k, \hat{\theta}_k)[\overline{x}[1], \ldots, \overline{x}[N]] \quad \text{[Equation 31]}$$

$$= \sum_{i=1}^{K} \overline{\gamma}_i' f^H(\hat{v}_k, \hat{\theta}_k) f(v_i, \theta_i)$$

$$\left[ \exp\left\{ j2\pi \left( k\tau_{0i} + \frac{v_i}{\lambda} \right) nT_s \right\}, n = 1, \ldots, N \right]$$

$$= \overline{\gamma}_i' f^H(\hat{v}_k, \hat{\theta}_k) f(v_k, \theta_k)$$

$$\left[ \exp\left\{ j2\pi \left( k\tau_{0k} + \frac{v_k}{\lambda} \right) nT_s \right\}, n = 1, \ldots, N \right] + IN$$

Since an effect similar to passing the vector $f^H(\hat{v}_k, \hat{\theta}_k)$ formed by the velocity and azimuth of the target through a matched filter occurs, the received vector may be combined so that a signal-to-noise ratio (SNR) toward the target is maximized. Therefore, signals reflected from other targets may be nulled. $y_k$ may be a signal obtained by adding a noise to a signal obtained by sampling a single tone signal generated by a single beat frequency $k\tau_{0k}$ corresponding to a distance between the k-th target and the detection apparatus (e.g., antenna) every $T_s$. A peak frequency that is a result of a fast Fourier transform (FFT) on $y_k$ may be a beat frequency, and the detection apparatus may estimate the distance between the k-th target and the detection apparatus (e.g., antenna) using Equation 32 below.

$$\hat{f}_{beat} = \text{peak}(FFT(y_k)) \quad \text{[Equation 32]}$$

$$\hat{f}_{beat} = \left( k\frac{2R_k}{c} + \frac{v_k}{\lambda} \right) \Rightarrow \hat{R}_k = \frac{c}{2k}\left( \hat{f}_{beat} - \frac{\hat{v}_k}{\lambda} \right)$$

Meanwhile, the performances according to the above-described embodiments may be as follows. The operating frequency $f_c$, the transmit antennas, and the receive antennas of the detection apparatus may be defined as shown in Table 1 below.

TABLE 1

| Parameters | Value |
|---|---|
| Operating frequency | 77 GHz |
| Number of transmit antennas ($M_t$) | 2 |
| Number of receive antennas ($M_r$) | 8 |

It may be assumed that there are three targets in front of the detection apparatus. The parameters (e.g., distances, azimuths, and velocities) of the three targets may be defined as shown in Table 2 below.

TABLE 2

| | Target #1 | Target #2 | Target #2 |
|---|---|---|---|
| Distance | 70 m | 80 m | 90 m |
| Azimuth $\theta_k$ | −10° | 0° | −13° |
| Velocity $v_k$ | 50 m/s | 80 m/s | 70 m/s |

The distance may be a distance between the detection apparatus (e.g., antenna) and each target. The azimuth $\theta_k$ of the target may be determined on the basis of the detection apparatus. The velocity $v_k$ of the target may be a velocity relative to the detection apparatus. k may be the index of the target.

The signals transmitted from the transmit antennas may be reflected by the targets and the receive antennas may receive the reflected signals from the targets. The strengths of the received signals at the receive antennas may be assumed to be inversely proportional to the fourth power of the distances defined in Table 2. Here, additive white Gaussian noise (AWGN) may exist, and a variance value may be set to $8.57 \times 10^{-4}$.

Figure 3:
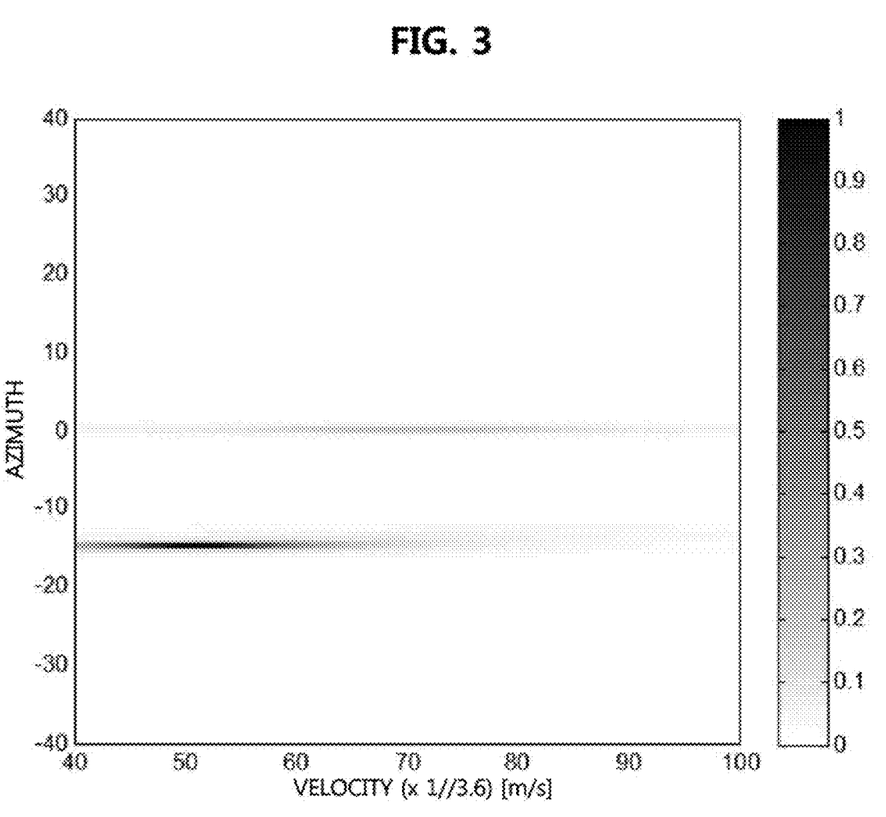
FIG. 3 is a graph illustrating results of performing a conventional 2D MUSIC algorithm.

The results of the conventional 2D MUSIC algorithm based on the parameters defined in Table 1 and Table 2 may be as shown in FIG. 3 below. The search interval for the 2D MUSIC algorithm may be (speed grid=−40: 0.5: 100, angle grid=−30: 0.5: 30).

FIG. 3 is a graph illustrating results of performing a conventional 2D MUSIC algorithm.

Referring to FIG. 3, since the magnitude of the signal reflected by the target #1 is larger than that of the signal reflected by the target #3, the signal reflected by the target #1 may act as interference to the signal reflected by the target #3. Therefore, the detection apparatus may not accurately estimate the parameters (e.g., distance, azimuth, and speed) of the target #3.

On the other hand, when the 2D MUSIC algorithm based on an orthogonal projection-based interference cancellation technique is used, the detection apparatus may estimate the parameters of the target #1 based on the received signal, derive a first signal by cancelling the interference caused by the target #1 from the received signal, estimate the parameters of the target #2 based on the first signal, derive a second signal by cancelling the interference caused by the target #2 from the first signal, and estimate the parameters of the target #3 based on the second signal. The results of the 2D MUSIC algorithm using the orthogonal projection-based interference cancellation technique may be as shown in FIG. 4 below.

Figure 4:
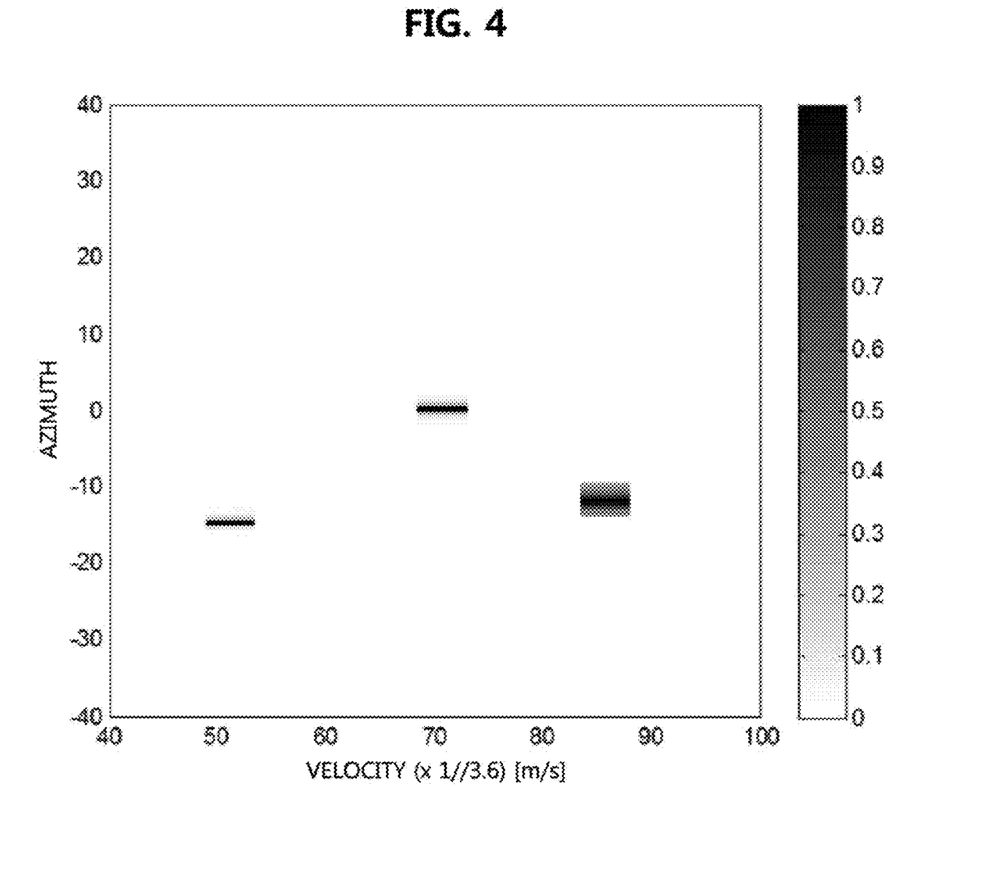
FIG. 4 is a graph illustrating results of performing a 2D MUSIC algorithm using an orthogonal projection-based interference cancellation technique.

FIG. 4 is a graph illustrating results of performing a 2D MUSIC algorithm using an orthogonal projection-based interference cancellation technique.

Referring to FIG. 4, the detection apparatus may accurately estimate the velocity and azimuth angle of each of the targets #1 to #3, and may estimate the distance of each of the targets #1 to #3 based on the velocity and azimuth.

Figure 5:
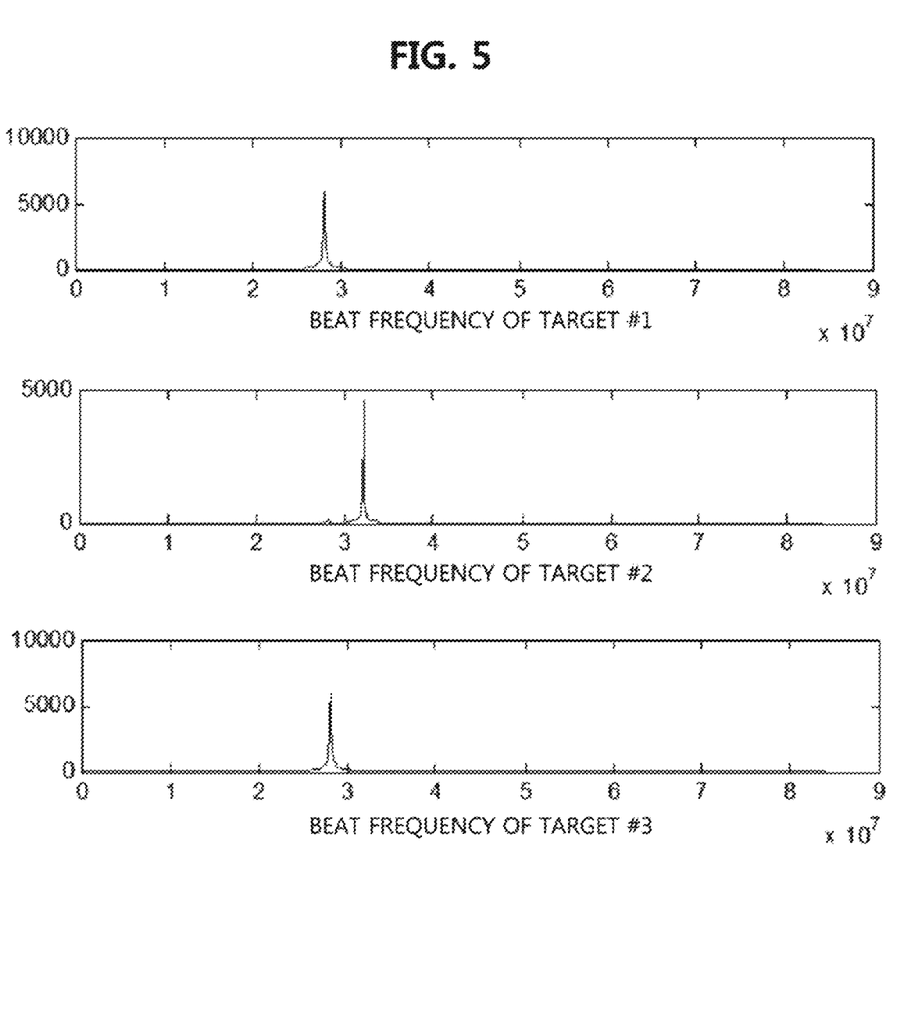
FIG. 5 is a graph illustrating errors caused by a conventional 2D MUSIC algorithm.

On the other hand, when the conventional 2D MUSIC algorithm is used, a complicated calculation process may be required to derive the roots of Equation 12 with respect to 120×120 grids. Further, when the conventional 2D MUSIC algorithm is used, the detection apparatus may estimate the distance of the target by performing the FFT. In this case, an estimation error may occur. For example, when estimating the distance, an error may occur as follows.

FIG. 5 is a graph illustrating errors caused by a conventional 2D MUSIC algorithm.

Referring to FIG. 5, when the peak value of $J(v,\theta)$ in Equation 12 is erroneously determined, the detection apparatus may determine that the beat frequency of the target #1 is equal to the beat frequency of the target #3. Accordingly, the detection apparatus may determine the distance of the target #1 to be 69.8679 m, determine the distance of the target #2 to be 80.0051 m, and determine the distance of the target #3 to be 69.8679 m. That is, the distance of the target #3 estimated by the detection apparatus may be different from the distance of the target #3 defined in Table 2.

Meanwhile, the mean squared error (MSE) for the velocity estimated by the conventional 2D MUSIC algorithm and the MSE for the velocity estimated by the 2D MUSIC algorithm proposed by the present disclosure may be as shown in Table 3 below.

TABLE 3

| Algorithm | SNR | | | | | |
| --- | --- | --- | --- | --- | --- | --- |
| | 0 | 5 | 10 | 15 | 20 | 25 |
| Conventional 2D MUSIC | 53.9 | 53.1 | 55.5 | 55.2 | 55.2 | 55.1 |
| 2D MUSIC to which an orthogonal projection-based interference cancellation technique is applied | $2.24 \times 10^{-3}$ | $2.41 \times 10^{-3}$ | $2.50 \times 10^{-3}$ | $2.57 \times 10^{-3}$ | $2.56 \times 10^{-3}$ | $2.60 \times 10^{-3}$ |
| 2D root MUSIC based on low-complexity approximation | 0.34 | 0.16 | 0.52 | 0.27 | 0.46 | 0.29 |

The MSE for the azimuth estimated by the conventional 2D MUSIC algorithm and the azimuth estimated by the 2D MUSIC algorithm proposed by the present disclosure may be as shown in Table 4 below.

TABLE 4

| Algorithm | SNR | | | | | |
| --- | --- | --- | --- | --- | --- | --- |
| | 0 | 5 | 10 | 15 | 20 | 25 |
| Conventional 2D MUSIC | 715 | 713 | 717 | 723 | 723 | 721 |
| 2D MUSIC to which an orthogonal projection-based interference cancellation technique is applied | 175 | 175 | 175 | 176 | 172 | 172 |
| 2D root MUSIC based on low-complexity approximation | 1.86 | 3.08 | 2.01 | 2.15 | 1.64 | 1.99 |

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method performed by an apparatus for detecting multiple targets, the operation method comprising:
    transmitting first signals using $M_t$ transmit antennas included in the apparatus;
    receiving the first signals reflected by the multiple targets through $M_r$ receive antennas included in the apparatus;
    generating a first function for estimating a velocity and an azimuth of each of the multiple targets using the first signals and the reflected first signals;
    estimating a velocity and an azimuth that maximize a result of the first function as a velocity and an azimuth of a first target closest to the apparatus among the multiple targets;
    generating a first matrix based on the velocity and the azimuth of the first target estimated based on the first function;
    generating a projected matrix by projecting the first matrix on an orthogonal region;
    generating a second function for estimating a velocity and an azimuth of a second target among the multiple targets, by performing an eigen-value decomposition on a sample covariance matrix of the projected matrix; and
    estimating a velocity and an azimuth that maximize a result of the second function as the velocity and the azimuth of the second target,
    wherein a distance between the apparatus and the second target is greater than or equal to a distance between the apparatus and the first target, and each of $M_t$ and $M_r$ is a natural number greater than or equal to 2.

2. The operation method according to claim 1, wherein the first signals transmitted by the $M_t$ transmit antennas are orthogonal to each other.

3. The operation method according to claim 1, wherein the first function is generated based on a 2-dimensional multiple signal classification (MUSIC) algorithm.

4. The operation method according to claim 1, wherein the first function comprises the first matrix formed by velocities and azimuths of the multiple targets, a Hermitian matrix for the first matrix, a second matrix formed by a noise subspace, and a Hermitian matrix for the second matrix.

5. The operation method according to claim 1, wherein $M_t \times M_r$ virtual array elements are implemented by the $M_t$ transmit antennas and the $M_r$ receive antennas, and the first function is generated based on the first signals and the reflected first signals transmitted and received through the $M_t \times M_r$ virtual array elements.

6. The operation method according to claim 1, further comprising:
    generating a second signal comprising a beat frequency indicative of the distance between the apparatus and the first target using the first matrix; and
    estimating a result of a fast Fourier transform (FFT) on the second signal as the distance between the apparatus and the first target.

7. An apparatus for detecting multiple targets, the apparatus comprising a processor, $M_t$ transmit antennas transmitting first signals according to control of the processor, $M_r$ receive antennas receiving the first signals reflected by the multiple targets according to control of the processor, and a memory storing at least one instruction executable by the processor, wherein the processor is configured to:
    generate a first function for estimating a velocity and an azimuth of each of the multiple targets using the first signals and the reflected first signals;
    estimate a velocity and an azimuth that maximize a result of the first function as a velocity and an azimuth of a first target closest to the apparatus among the multiple targets;
    generating a first matrix based on the velocity and the azimuth of the first target estimated based on the first function;
    generating a projected matrix by projecting the first matrix on an orthogonal region;
    generate a second function for estimating a velocity and an azimuth of a second target among the multiple targets, by performing an eigen-value decomposition on a sample covariance matrix of the projected matrix; and
    estimate a velocity and an azimuth that maximize a result of the second function as the velocity and the azimuth of the second target,
    wherein a distance between the apparatus and the second target is greater than or equal to a distance between the apparatus and the first target, and each of $M_t$ and $M_r$ is a natural number greater than or equal to 2.

8. The apparatus according to claim 7, wherein the first function comprises the first matrix formed by velocities and azimuths of the multiple targets, a Hermitian matrix for the first matrix, a second matrix formed by a noise subspace, and a Hermitian matrix for the second matrix.

9. The apparatus according to claim 7, wherein $M_t \times M_r$ virtual array elements are implemented by the $M_t$ transmit antennas and the $M_r$ receive antennas, and the first function is generated based on the first signals and the reflected first signals transmitted and received through the $M_t \times M_r$ virtual array elements.

10. The apparatus according to claim 7, wherein the processor is further configured to:
    generate a second signal comprising a beat frequency indicative of the distance between the apparatus and the first target using the first matrix; and
    estimate a result of a fast Fourier transform (FFT) on the second signal as the distance between the apparatus and the first target.

* * * * *